United States Patent
Lakhzouri et al.

(10) Patent No.: US 8,964,510 B1
(45) Date of Patent: Feb. 24, 2015

(54) SYSTEMS AND METHODS FOR SIGNAL ACQUISITION USING PREDICTED ENVIRONMENTAL CONTEXT

(75) Inventors: Abdelmonaem Lakhzouri, Tampere (FI); Juha Tapani Rostrom, Tampere (FI)

(73) Assignee: Qualcomm Incorporated, San Diego, CA (US)

( * ) Notice: Subject to any disclaimer, the term of this patent is extended or adjusted under 35 U.S.C. 154(b) by 695 days.

(21) Appl. No.: 13/036,575

(22) Filed: Feb. 28, 2011

Related U.S. Application Data

(63) Continuation-in-part of application No. 11/835,914, filed on Aug. 8, 2007, now Pat. No. 7,920,441, which is a continuation-in-part of application No. 11/534,148, filed on Sep. 21, 2006, now abandoned.

(60) Provisional application No. 60/719,387, filed on Sep. 22, 2005.

(51) Int. Cl.
G04C 13/00 (2006.01)
(52) U.S. Cl.
USPC .................. 368/47; 342/357.22; 342/357.39
(58) Field of Classification Search
USPC .............. 368/46–47, 14; 342/357.22, 357.39, 342/357.2
See application file for complete search history.

(56) References Cited

U.S. PATENT DOCUMENTS

| | | | |
|---|---|---|---|
| 4,983,980 A | 1/1991 | Ando | |
| 6,212,133 B1 | 4/2001 | McCoy et al. | |
| 6,278,660 B1 | 8/2001 | Tognazzini | |
| 6,729,755 B1 | 5/2004 | Yin | |
| 6,750,813 B2 | 6/2004 | Vargas-Hurlston et al. | |
| 7,053,824 B2 | 5/2006 | Abraham | |
| 7,812,763 B2* | 10/2010 | Baba et al. | 342/357.67 |
| 7,920,441 B2 | 4/2011 | Rostrom | |
| 7,936,642 B1* | 5/2011 | Wang et al. | 368/47 |
| 8,116,170 B2* | 2/2012 | Matsuzaki | 368/47 |
| 8,169,857 B2* | 5/2012 | Matsuzaki | 368/47 |
| 8,184,505 B1* | 5/2012 | Wang et al. | 368/47 |
| 2003/0027529 A1 | 2/2003 | Haugli et al. | |
| 2004/0209625 A1 | 10/2004 | Haddrell | |
| 2005/0148306 A1 | 7/2005 | Hiddink | |
| 2005/0221827 A1 | 10/2005 | Natsume | |
| 2007/0210957 A1 | 9/2007 | Brodie et al. | |
| 2009/0059841 A1 | 3/2009 | Laroia et al. | |
| 2010/0220555 A1* | 9/2010 | Honda | 368/14 |

FOREIGN PATENT DOCUMENTS

| | | |
|---|---|---|
| JP | 7312590 A | 11/1995 |
| JP | 11146375 A | 5/1999 |
| JP | 2001326592 A | 11/2001 |

* cited by examiner

*Primary Examiner* — Sean Kayes
(74) *Attorney, Agent, or Firm* — Bay Area Technology Law Group PC

(57) ABSTRACT

This disclosure involves methods and systems for a GNSS receiver to ascertain its environmental context and subsequently adjust the signal processing and search algorithms to provide improved acquisition. A rapid pre-scan is performed to determine the presence of relatively strong signals. If no satellites are found in the initial pre-scan, successively more sensitive searches are conducted until at least one satellite is acquired. The information from these pre-scans is used to predict the environmental context of the receiver and correspondingly tailor the parameters for the remaining search operations.

18 Claims, 5 Drawing Sheets

SYSTEMS AND METHODS FOR SIGNAL ACQUISITION USING PREDICTED ENVIRONMENTAL CONTEXT

CROSS REFERENCE TO RELATED APPLICATIONS

This application is a continuation-in-part of co-pending, related U.S. patent application Ser. No. 11/835,914, filed Aug. 8, 2007 which is a continuation-in-part of U.S. patent application Ser. No. 11/534,148, filed Sep. 21, 2006 which, in turn, claims the benefit of U.S. Provisional Patent Application Ser. No. 60/719,387 filed Sep. 22, 2005.

FIELD OF THE PRESENT INVENTION

This disclosure relates generally to satellite navigation receivers and in particular to systems and methods for acquiring signals by predicting the environmental context.

BACKGROUND OF THE INVENTION

Global navigation satellite systems (GNSS) allow electronic receivers to determine navigational information such as position (latitude, longitude, and altitude), velocity and time, also known as PVT information. One example of such a system is the United States Naystar Global Positioning System (GPS), which may include up to thirty-two or more functional navigation satellites. Other examples of satellite navigation systems include the Russian GLONASS system, the European Galileo system, the Chinese Compass/Beidou system, and the Japanese QZSS. Satellite navigation receivers, such as GPS receivers typically use GPS data from three or more orbiting satellites to determine navigation information. Only a portion of the satellites within a navigation system may be visible to a particular navigation receiver at a given time.

GPS satellites typically transmit a signal based on spread spectrum coding known as code division multiple access (CDMA) on two bands, the L1 band with a carrier frequency of 1575.42 MHz and the L2 band with a carrier frequency of 1227.60 MHz. Each satellite is assigned a coarse acquisition (C/A) code (PRN) that resembles pseudo random noise and is typically unique to that satellite. Once a GPS signal with a particular PRN code is received and identified, the GPS receiver is said to have "acquired" the GPS satellite associated with that PRN. A GPS receiver may also "track" a GPS satellite by continuing to receive a GPS signal from a previously acquired GPS satellite.

The conventional approach to using GPS satellites for user positioning requires the receiver to acquire, track and download the navigation message from 4 or more visible satellites in order to determine an adequate PVT solution. The navigation message from each satellite contains the broadcast ephemeris, the ionospheric models, and UTC-GPS clock correction that are necessary for the user to compute the position of the satellites in the earth-centered earth-fixed (ECEF) coordinate system for a specified time. Given that satellite signals are relatively weak, it can be difficult to maintain adequate signal reception for the period of time necessary to download the required information. These problems are exacerbated when external conditions interfere with signal reception, such as when the receiver is indoors or in environments having tall buildings (an "urban canyon"), obscuring topographical features or dense foliage.

To mitigate these problems, techniques to supplement the information delivered by satellite have been developed, and are generally known as Assisted GNSS, A-GPS for example. Such techniques involve the delivery of ephemeris or other data over a network rather than being received from a satellite. Since it is not necessary to wait for download of the broadcast ephemeris data, performance metrics such as time to first fix (TTFF), reliability and receiver sensitivity can be dramatically improved, particularly when the sub-optimal signal conditions associated with urban canyons or indoor locations interfere with the download of the complete satellite broadcast. Use of other sources of navigational data can also minimize power consumption, since less time is required to maintain a fix on the satellites and a position determination can be made more quickly.

The performance of a GNSS receiver also depends heavily on its ability to rapidly find visible satellites. Acquisition of a satellite involves correlating the incoming signal with a local code replica, which is characterized with particular values for the frequency offset to account for Doppler variations and code phase delay. A traditional approach is to sequentially scan all possible combinations of frequencies and code-phases in the search space, until the correlation value exceeds a predefined threshold. If an insufficient number of satellites are acquired during the search at a given signal level, the function is then repeated using parameters for the next sequential level of search. Although such techniques will generally acquire satellites having sufficient signal strength, there is a considerable time overhead to exhaust all combinations at all signal levels.

As will be appreciated, GNSS receivers are expected to operate quickly in a wide variety of operating conditions. For example, mobile cellular telephones are required to meet certain Enhanced 911 (E911) standards to provide emergency responders with accurate location information under many signal conditions, including strong signals, weak signals and combinations of strong and weak signals. To meet these standards, an associated GNSS receiver must be able find both strong and weak signals relatively quickly. Conventional search strategies that simply sequentially increase the sensitivity of the receiver will often fail to find weak signals within the required time limits. Similarly, search strategies that focus on weak signals first often do not provide sufficient performance with respect to strong signals.

Accordingly, it would be desirable to provide a mobile receiver that provides improved performance in mixed signal conditions, including having lower TTFFs. This invention satisfies these and other needs.

SUMMARY OF THE INVENTION

In accordance with the above objects and those that will be mentioned and will become apparent below, this disclosure is directed to a method for acquiring signals with a mobile receiver based on predicted environmental context, the method comprising, with the receiver, providing a series of n search steps, wherein each search step corresponds to a distinct signal level ranging from relatively stronger to relatively weaker and wherein each search step has a total integration time greater than a preceding search step, performing a pre-scan search at successive search steps from a first pre-scan search step to a last pre-scan search step within the series of n search steps until a number of satellites are acquired, including at least one satellite, performing a context awareness decision based on the number of satellites acquired and the last search step, setting an initial scan search step based upon the context awareness decision; and performing a scan search using the initial scan search step wherein the scan search step has a greater sensitivity than the last pre-scan search step.

Preferably, the step of setting the initial scan search step includes setting the initial scan search step to a search step within the series having a sensitivity greater than the last pre-scan search step, wherein the series of n search steps includes a first search step having less sensitivity than a second search step having less sensitivity than a third search step, and wherein the step of performing a scan search includes performing the search at successive search steps starting at the initial search step. Also preferably, a navigational solution is calculated whenever at least four satellites have been acquired.

In the noted embodiments, the initial scan search step can be set to the first search step when the pre-scan search returns a plurality of satellite acquisitions at a search step corresponding to a relatively stronger signal, the initial scan search step can be set to the second search step when the pre-scan search returns no satellite acquisitions at a search step corresponding to a relatively stronger signal, and the initial scan search step can be set to the third search step when the pre-scan search returns only one satellite acquisition at a search step corresponding to a relatively stronger signal. In one aspect, the third search step is the nth search step.

In another aspect, the method also includes the steps of performing a supplemental search scan at a fourth search step, wherein the fourth search step has a sensitivity greater than the last pre-scan search step and less than the nth search step, acquiring a satellite in the supplemental search scan, decoding bit edge timing information from the satellite acquired in the supplemental search scan, and performing the scan search at the third search step using the bit edge timing information.

In yet another aspect, the method further includes the step of increasing the sensitivity of the initial search step when fewer than four satellites are acquired during the scan search using the initial search step. Preferably, the method also includes determining bit edge timing information when required for the increased sensitivity initial search step.

The disclosure is also directed to a mobile receiver for acquiring signals based on predicted environmental context, wherein the receiver is configured with a series of n search steps, wherein each search step corresponds to a distinct signal level ranging from relatively stronger to relatively weaker and wherein each search step has a total integration time greater than a preceding search step and wherein the receiver is configured to: perform a pre-scan search at successive search steps from a first pre-scan search step to a last pre-scan search step within the series of n search steps until a number of satellites are acquired, including at least one satellite; perform a context awareness decision based on the number of satellites acquired and the last search step; set an initial scan search step based upon the context awareness decision; and perform a scan search using the initial scan search step wherein the scan search step has a greater sensitivity than the last pre-scan search step.

Further, the receiver is preferably configured to set the initial scan search step by setting the initial scan search step to a search step within the series having a sensitivity greater than the last pre-scan search step, wherein the series of n search steps includes a first search step having less sensitivity than a second search step having less sensitivity than a third search step, and wherein the receiver is configured to perform the scan search by performing the search at successive search steps starting at the initial search step.

In one aspect, the receiver is configured to calculate a navigational solution when at least four satellites have been acquired.

Preferably, the receiver is configured to set the initial scan search step to the first search step when the pre-scan search returns a plurality of satellite acquisitions at a search step corresponding to a relatively stronger signal, to set the initial scan search step to the second search step when the pre-scan search returns no satellite acquisitions at a search step corresponding to a relatively stronger signal and to set the initial scan search step to the third search step when the pre-scan search returns only one satellite acquisition at a search step corresponding to a relatively stronger signal. In one aspect, the third search step is the nth search step.

In another aspect, the receiver is further configured to perform a supplemental search scan at a fourth search step, wherein the fourth search step has a sensitivity greater than the last pre-scan search step and less than the nth search step, acquire a satellite in the supplemental search scan, decode bit edge timing information from the satellite acquired in the supplemental search scan, and perform the scan search at the third search step using the bit edge timing information.

In yet another aspect, the receiver is further configured to increase the sensitivity of the initial search step when fewer than four satellites are acquired during the scan search using the initial search step. Preferably, the receiver also determines bit edge timing information when required for the increased sensitivity initial search step.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

This disclosure involves methods and systems for a GNSS receiver to ascertain its environmental context and subsequently adjust the signal processing and search algorithms to provide improved acquisition. As will be appreciated, GNSS receivers are typically expected to operate under a wide variety of circumstances, ranging from the availability strong signals from multiple satellites, to a single strong signal together with weak signals to weak signals alone. By employing the disclosed techniques, acquisition performance with weak signals is improved while robust performance in strong signals conditions is maintained.

At the outset, it is to be understood that this disclosure is not limited to particularly exemplified materials, methods or structures as such may, of course, vary. Thus, although a number of materials and methods similar or equivalent to those described herein can be used in the practice of embodiments of this disclosure, the preferred materials and methods are described herein.

It is also to be understood that the terminology used herein is for the purpose of describing particular embodiments of this disclosure only and is not intended to be limiting.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a," "an" and "the" include plural referents unless the content clearly dictates otherwise.

Figure 1:
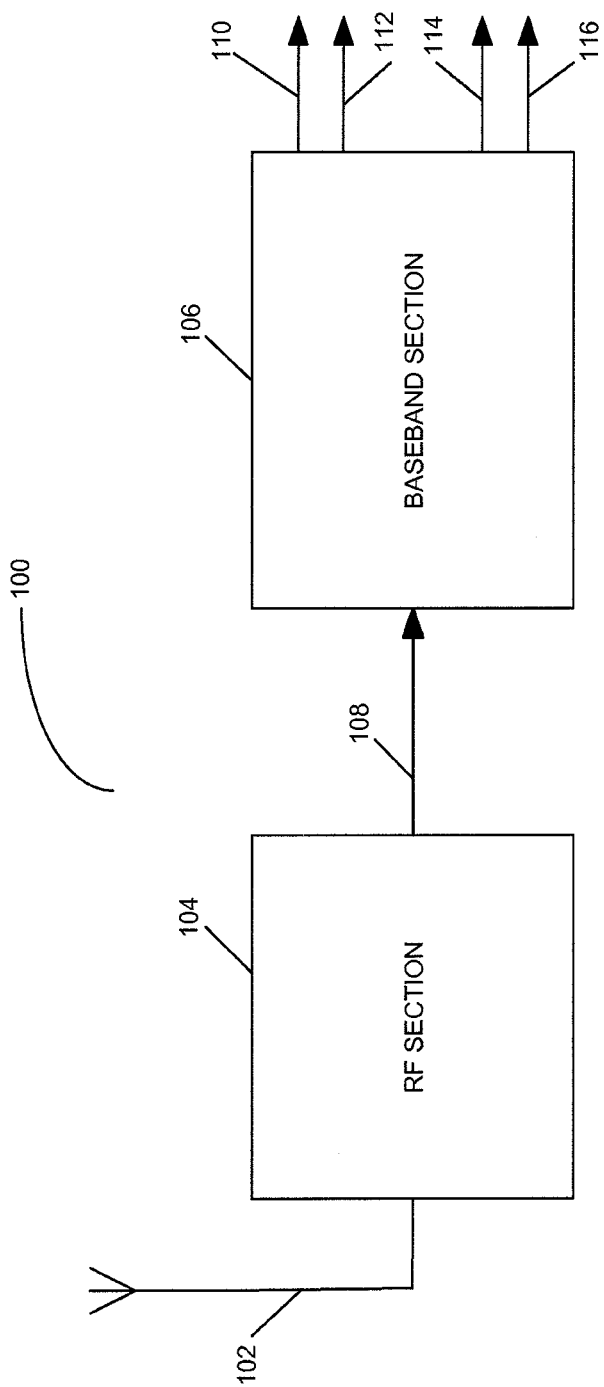
FIG. 1 illustrate a top-level block diagram of a mobile receiver, suitable for practicing an embodiment of the invention.

FIG. 1 illustrates a top-level block diagram of a GPS receiver. Receiver 100 typically comprises an antenna 102, a Radio Frequency (RF) section 104, and a baseband section 106. Typically, antenna 102 receives signals that have been transmitted by a GPS satellite, that are then amplified and downconverted in the RF section 104. RF section 104 then sends signals 108 to baseband section 106 for processing and position determination. Signals 108 typically include an oscillator signal, an in-phase signal, a quadrature-phase signal an Automatic Gain Control (AGC) signal, and other signals. Baseband section 106 generates multiple outputs 110-116, e.g., Doppler, preprocessed Intermediate Frequency (IF) data, integrated phase, pseudorange, time, velocity, position, etc.

Figure 2:
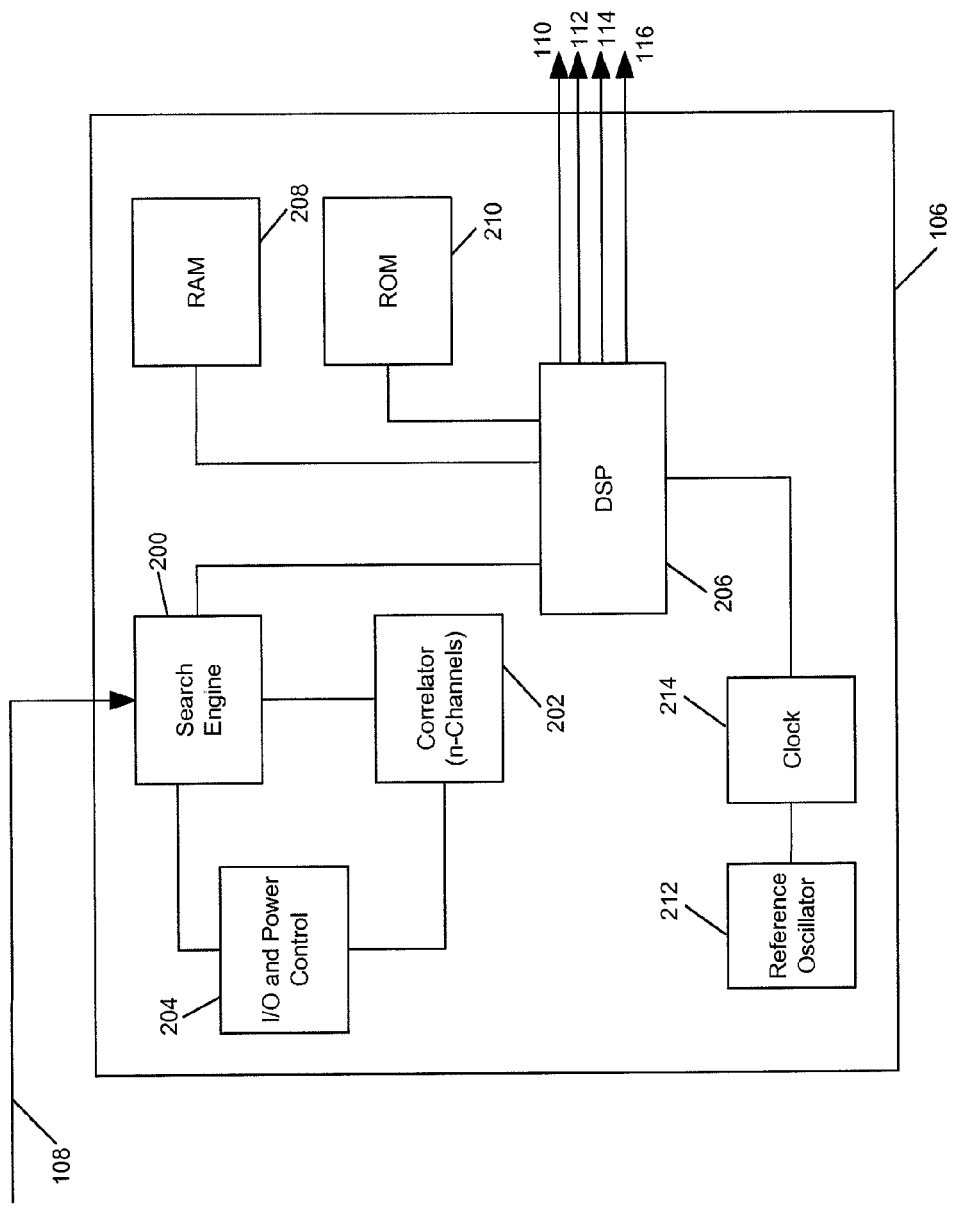
FIG. 2 illustrates a diagram of the baseband section of the receiver of FIG. 1.

FIG. 2 illustrates a diagram of the baseband section of a GPS receiver. Baseband section 106 receives signals 108 from the RF section 104, and uses search engine 200 and correlator 202 to process the signals 108 to obtain useful data. Input/Output (110) control 204 is coupled to search engine 200 and correlator 202 to manage the power and data flow for search engine 200 and correlator 202. Alternatively, the architecture may comprise only a correlator 202, which is then used for both searching and tracking purposes, which can be modified for reduced power consumption. DSP 206 accesses RAM 208 and ROM 210 for various programming steps that are used to process the data discovered by search engine 200 and correlator 202. DSP then generates the output signals 110-116.

As indicated above, acquisition typically involves a sequential detection algorithm. Conventionally, each stage of the search is optimized to obtain signals at a given strength, wherein strong signals are sought first, followed by searches for increasingly weaker signals. As is known in the art, the code phase is determined for each received satellite signal by correlation with a locally-generated reference signal corresponding to that satellite's individual C/A code. The correlation operation is performed over a period of time, often less than the duration of a bit of the navigation message to minimize bit edge detection ambiguities or loss due to signal reversal. The real time correlation output is termed the coherent integration time (CIT). Further, a summing of a series of coherent correlations can also be determined, which is termed the non-coherent integration time (NCIT). The combination of the two is correspondingly termed the total integration time (TIT).

Figure 3:
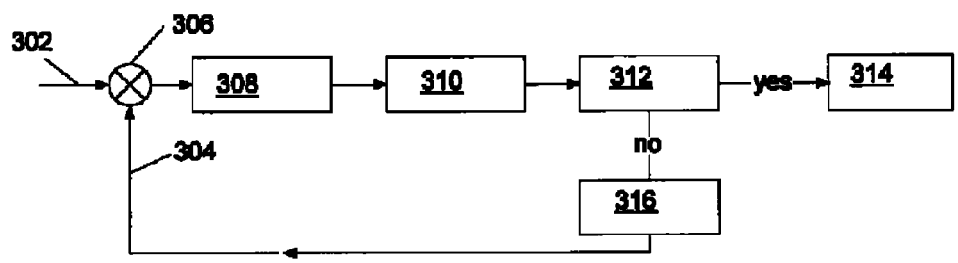
FIG. 3 is a simplified flowchart depicting aspects of an acquisition search function.

A simplified acquisition function is shown schematically in FIG. 3. As can be seen, received signal 302 is multiplied with generated code replica 304 in mixer block 306. The output is integrated and dumped in coherent integration block 308. A desired number of coherent integration operations are summed in non-coherent integration block 310 and is output to comparator block 312. If the correlation peak is greater than a desired threshold, the satellite is considered to be acquired in block 314. If not, a new code phase delay and frequency offset are established in block 316 and the corresponding code replica 304 is generated to be sent to mixer 306.

The techniques of this disclosure tailor the search steps to match the receiver's predicted environmental context. Preferably, this is implemented by performing a rapid pre-scan to determine the presence of relatively strong signals. If no satellites are found in the initial pre-scan, successively more sensitive searches are conducted until at least one satellite is acquired. The information from these searches is used to predict the environmental context of the receiver and correspondingly set the parameters for the remaining search operations. For example, if more than one strong signal is found, the receiver is predicted to be in an environment ranging from open sky to urban canyon and the search step is set to an intermediate sensitivity. Alternatively, if no strong signals were found, the receiver is predicted to be in an urban canyon condition and the search step is set to a relatively greater sensitivity. Finally, if only a single strong signal is found, the receiver is predicted to be in an indoor condition and the search step is set to even greater sensitivity. As will be appreciated, the GPS baseband shown in FIG. 2 can primarily implement these steps using the search engine 200 and correlator 202, however, as desired, these functions can be implemented in other blocks or combined into a single block.

Figure 4:
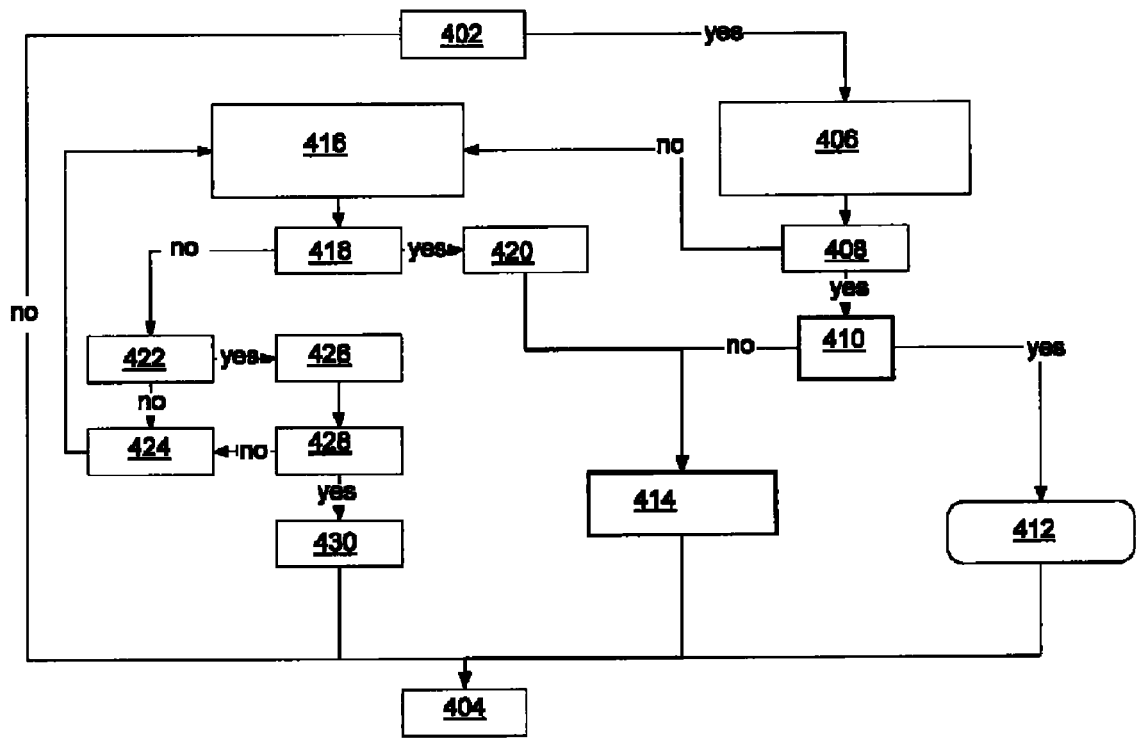
FIG. 4 is a flowchart showing the steps involved in performing a pre-scan to assess the presence of strong and weak signals, according to the invention.
Figure 5:
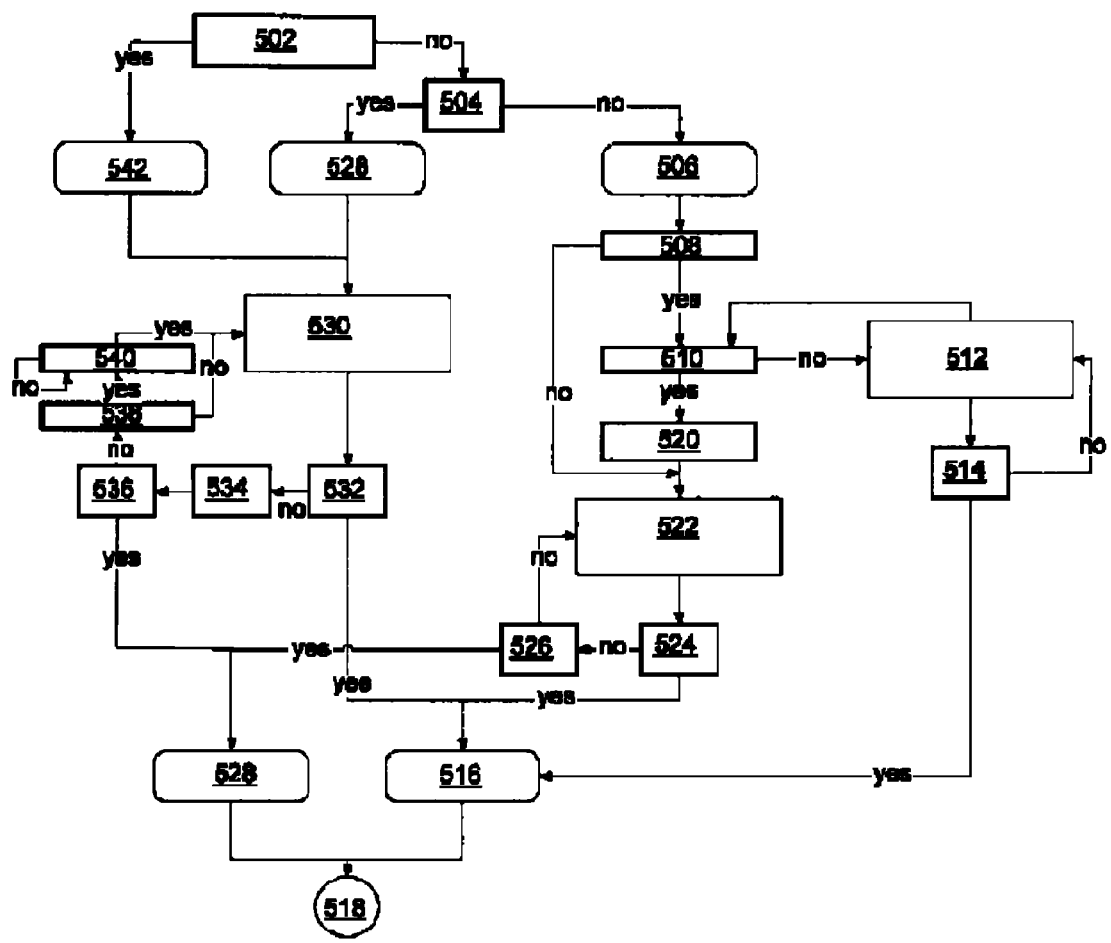
FIG. 5 is a flowchart showing the steps involved in performing an environmental context prediction and search function optimization routine, according to the invention.

One suitable implementation of an environmental prediction and search optimization technique of the disclosure is schematically depicted in FIGS. 4 and 5. As will be described in detail below, FIG. 4 illustrates the steps involved in a pre-scan to identify the presence of strong signals and establish a baseline sensitivity for weak signals and FIG. 5 details the prediction of environmental context and corresponding adjustments made to the search functions to optimize performance during a scan.

With respect to this implementation, reference is made to n search steps that correspond to n different signal levels. In one preferred embodiment, the different search steps $L_1$, ranging from $L_1$ to $L_n$ in which $L_1=-135$ dBm, $L_2=-142$ dBm to $-144$ dBm, and $L_i=L_{i-1}-3$ dBm for i=3 . . . 9. In other embodiments, different numbers of search steps corresponding to different signal levels or different and varying intervals can be employed as desired.

In turn, the primary parameters used by the search function at each search step CIT and NCIT, are established to achieve the desired sensitivity for the associated signal level. As examples of coherent and non-coherent integration times:

−135 dBm:

Search stage: CIT: 3 msec, NCIT: 5

Verification stage: CIT: 5 msec, NCIT: 3

Total Integration time with verification: search time+2× verification $$TIT=3 \text{ msec} \times 5+2\times(5 \text{ msec}\times 3)=45 \text{ msec}$$

As will be appreciated, CIT and NCIT can each be balanced to achieve the desired sensitivity and the combination will have a corresponding TIT. In general, overall sensitivity will increase as TIT increases. Accordingly, in a preferred embodiment, each sequential search level $L_i$ has a greater TIT than the preceding level.

Turning now to FIG. 4, step 402 confirms that assistance data is available to supplement the navigational information obtained from the satellites. As will be described below, this supplemental information to narrow the search space after the environmental context has been determined. If assistance is not available, the process exits to a conventional mode as indicated by step 404. Otherwise the process continues to step 406 in which a pre-scan is performed using the full uncertainty range of code phase delays and Doppler frequency offsets while searching for relatively strong signals, such as at levels $L_1$ and $L_2$. For this step, total integration time $TIT=TIT_1+TIT_2$. Preferably, TIT does not exceed approximately 1 s. Using the above representative values for $L_1$ and $L_2$, any signals stronger than −142 dBm are acquired.

The process branches at step 408 and continues to step 410 if strong signals are found in the step 406 pre-scan. If four or more satellites are acquired in the pre-scan, a navigational solution can be computed conventionally in step 412 and the process then exits at step 404. If less than four satellites are acquired, the process leads to step 414, in which the context prediction and search optimization routines shown in FIG. 5 are performed.

If no strong signals are found during the pre-scan, the process leads from step 408 to a supplementary pre-scan at step 416. The search function is initially set to a search level $L_i$ having a sensitivity greater than those used in step 406, for example, i=3 in this embodiment. Step 418 directs the process depending upon whether a signal is found at the last search step employed in step 416. If a signal is found, the supplementary pre-scan is halted in step 420 and the process flows to context prediction in step 414 and FIG. 5.

Otherwise, the routine checks whether all possible satellites have been searched for at the given signal level in step 422. If not, the next satellite is selected in step 424 and the process returns to step 416 to continue the search at the given signal level. Alternatively, if step 422 determines all possible satellites have been searched, then the sensitivity is increased in step 426 by employing a more sensitive search. Preferably, to increase the speed of the supplementary pre-scan, one or more search steps are skipped. For example, for step 416 carried out at level $L_i$, i is set to i+2 in step 426. If the new value for i calculated in step exceeds the number n of available search levels, then step 430 terminates the process and exits the routine in step 404. Otherwise, the process goes to step 424 to establish a next satellite PRN and the pre-scan repeats to step 416.

Preferably, the supplementary pre-scan initiated at step 416 is configured to identify a baseline sensitivity at which signals become available. In the embodiment shown, the sequence initiated by step 416 is a serial search so that once a single satellite is acquired, the process immediately moves to the context prediction indicated by step 414. Further, it will be appreciated that the search level indicated by $L_i$ is progressively more sensitive, as $TIT_i > TIT_{i-1}$.

As FIG. 4 illustrates, once a signal is acquired, as determined either by steps 408 or 418, the routine moves to step 414 for environmental context prediction and further search function optimization. The details of this portion of the process are shown in FIG. 5. To distinguish between the searches represented in FIG. 4, the search levels for FIG. 5 are denoted as $L_j$, wherein j=4 to n in this example.

Starting with step 502, it is determined whether the signals found were relatively strong or relatively weak. In other words, if i was less than 3, a signal was obtained at $L_1$ or $L_2$ and the process flows to step 504 to determine the number of signals found. When four or more satellites were acquired, a conventional navigational determination is made as described above with respect to step 412.

A determination in step 504 that one signal was found indicates that no other signals were strong enough to be detected at the initial pre-scan levels. In turn, the routine predicts in step 506 that this corresponds to an environmental context characteristic of dense urban canyons or indoor locations. Accordingly, the search level $L_j$ is preferably set to a relatively higher sensitivity. For example, setting j to n achieves the greatest sensitivity. Since employing the highest sensitivity setting corresponds to the longest TIT, a search at this setting may exceed a desired TTFF budget. In such instances, or when otherwise desired, j can be set to a less sensitive level, but should still correspond to greater sensitivity than the levels determined by other environmental contexts, referenced below. In turn, further iterations can performed at more sensitive search levels when desired.

Next, step 508 determines whether the search function at $L_j$, such as $L_n$, requires bit edge timing information. As will be appreciated, heightened sensitivity offered at the most sensitive search steps is realized in part by increasing the length of CIT to a value which is higher or equal to 20 msec. Since this is the length of a bit in the navigational message, knowledge of the bit edge timing minimizes the potential for signal loss. Step 508 is preferably configured to compare the CIT associated with $L_j$ to a given threshold to determine whether bit edge timing is needed.

Therefore, when step 508 determines bit edge timing information is required, the process goes to step 510 to check whether bit edge timing has been decoded from the navigational message. If it has not, the routine moves to step 512 to perform an supplemental scan at a search level $L_k$ between level $L_j$ and the level of the pre-scan in step 406, $L_2$.

If the total number of satellites acquired during the pre-scan of step 406 and the supplemental scan of step 512 is higher than four, step 514 sends the routine to step 516 to compute the navigational solution and the process exits in step 518. If the total number of satellites is fewer than four, the supplemental scan of step 512 continues.

Step 512 also loops to step 510 to determine whether bit edge timing information has been decoded during the supplemental scan as described above. In some embodiments, it can be desirable to set search level $L_3$ to a more sensitive value of k. Once bit edge timing is available, step 510 moves to step 520 to cancel any ongoing searches, such as the supplemental scans at step 512. The process then initiates a scan at step 522, setting the search level to the value established in step 506, which is j=n in this example. The scan is carried out at step 522 and step 524 checks whether a total of four satellites have been acquired. If so, the process is sent to step 516 to compute the navigational solution as discussed above. If not, step 526 determines whether a specified time out period has been reached. If so, the acquisition process fails in step 528 and then exits at step 518. If the time out has not been reached in step 526, the process returns to step 522 to continue the high sensitivity scan.

As described above, step 504 determines whether a single strong signal was found during the pre-scan of step 406. The process described above with respect to steps 506-526 is carried out when one signal was acquired. When more than one signal (but less than four as determined by step 410) was acquired in step 406, the environmental context is predicted to correspond to open sky to urban canyon conditions in step 528. Accordingly, the search level is set to an intermediate sensitivity, greater than the sensitivity employed in either steps 406 or the initial setting of step 416, for example as described above with respect to step 502. In this embodiment, j is set to 4, but other, more sensitive values can be employed if warranted by design goals.

The process continues with a scan performed in step 530 at a search level $L_j$. If a total of four or more satellites are acquired during step 530, then step 532 sends the process to step 516 to compute the navigational solution. If fewer than four are acquired, step 534 establishes a search level with increased sensitivity. In this embodiment, j is set to j+2 so that more sensitive searches will be employed rapidly, but other intervals or varied intervals can be used as desired. Step 536 checks whether the search level set by step 534 exceed the range n of available search levels. If so, the process fails at step 528. Otherwise, step 538 determines whether the increased CIT associated with the increase in sensitivity established by step 534 requires bit edge timing information, as discussed above with respect to step 510. If the timing information is not required, the process returns to step 530 to repeat the search, using the search level $L_j$ set in step 534. If timing information is required, step 540 checks the status of the ongoing search from step 530 to determine when the bit edge time has been decoded. Once that information is available, the process is allowed to continue to step 530.

As discussed above with regard to step 502, the search level, $L_i$, at which the pre-scans of step 406 and step 416 first acquire a satellite, is determined. When i is greater than 2, the process predicts the receiver is in a context corresponding to dense urban canyon conditions in step 542. Accordingly, search level $L_j$ is preferably set to a more sensitive level than that established in step 528. For example, in this embodiment j is set to i+2 so that if a satellite was acquired at $L_3$ in step 416, the scan at step 530 then would be initiated at $L_5$. As with the other aspects of the process, different or varied intervals can be used to tailor performance of the receiver as desired. Although the scan at 530 is initiated at a more sensitive level, the process then continues in the manner described above.

From the above discussion, one of skill in the art will appreciate that the context prediction evaluates the pre-scan results to determine the number of strong and weak signals and in turn predicts the environmental context accordingly. When multiple strong signals are found, an open sky to urban canyon context is predicted and the scan search is initiated using an intermediate search step at a sensitivity greater than the pre-scan. When no strong signals are found, an urban canyon context is predicted and the initial intermediate search step is chosen to be more sensitive than that used in the open sky to urban canyon context and is more sensitive than the search level at which a signal was acquired during the pre-scan. Finally, when only a single strong signal is found, an indoor context is predicted and the initial search step is chosen to be the most sensitive step.

As will be appreciated, the scans discussed above with respect to steps 512, 522 and 530 preferably employ a reduced search space. By employing known assisted GNSS techniques, such as data transmission over a wireless telephone network, the receiver obtains coarse time and position estimates as well as the ephemeris and almanac for a set of N satellites that are visible at the estimated time and position. From this information, predictions with regard to frequency offset and code phase delay are made as known in the art. Generally, the ability to obtain position information within approximately 20-30 km and GNSS time estimates within approximately 2 sec, in addition to the availability of ephemeris and almanac information allows the frequency offsets and code phase delays to be estimated.

Figure 6:
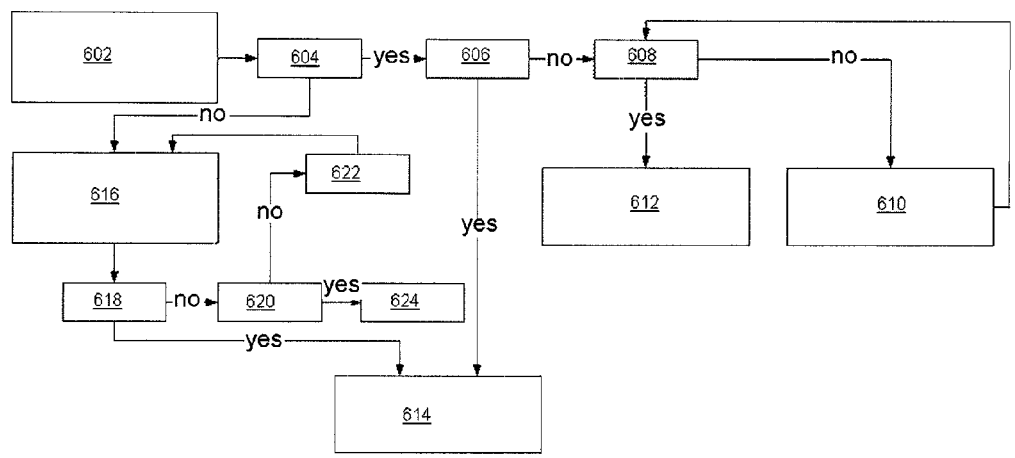
FIG. 6 is a flowchart shown another embodiment of a pre-scan and environmental context prediction routine, according to the invention.

Turning to FIG. 6, another embodiment of the disclosure is shown in the form of a flowchart depicting the steps in a simplified routine for performing the pre-scan and environmental context prediction at search steps set to example signal levels. The process begins at step 602, wherein a pre-scan for strong signals is performed. Here, the pre-scan is performed using search steps corresponding to –135 and 142 dBms. If signals are found in step 604, the process continues to step 606 to determine the number of strong signals found. If only one, the process goes to step 608, where it is determined whether bit edge timing information is known. If not, the process performs a medium level scan at a search step corresponding to –147 dBm in step 610, to ascertain the bit edge timing information. Once available, a low level scan is performed in step 612 at a search step corresponding to –155 dBm until at least four satellites are acquired.

Returning to step 606, if more than one signal was found during the first pre-scans of step 602, the process leads to step 614, wherein a medium scan is performed at a search step corresponding to –150 dBm until at least four satellites are acquired or the process is aborted.

Similarly, returning to step 604, if no signals are found at the first pre-scan levels, a second pre-scan at a search step corresponding to –145 dBm is performed at step 616. Step 618 determines whether a satellite was acquired in step 614. If yes, the process flows to step 614, for the medium scan discussed above. If not, step 620 is performed to determine whether all possible satellites have been searched. If not, the process goes to step 622 to select another PRN corresponding to a new satellite and then back to step 616 for another serial scan at –145 dBm. If all PRNs have been used as determined in step 620, the process quits in step 624.

As discussed above, the scans at steps 610, 612, 614 preferably make use of assisted GNSS information to facilitate prediction of frequency offsets and code phase delays to reduce the necessary search space.

Described herein are presently preferred embodiments directed to GNSS receivers, however, one skilled in the art that pertains to the present invention will understand that the principles of this disclosure can be extended easily with appropriate modifications to other receiver applications. As such, changes and modifications are properly, equitably, and intended to be, within the full range of equivalence of the following claims.

What is claimed is:

1. A method for acquiring signals with a mobile receiver based on predicted environmental context, the method comprising, with the receiver:

providing a plurality of search steps wherein each search step comprises a correlation operation having a total integration time and is configured to correspond to a distinct signal level ranging from relatively stronger to relatively weaker such that the total integration time of each search step is greater than the total integration time of a preceding search step, wherein the plurality of search steps includes a first search step having less sensitivity than a second search step having less sensitivity than a third search step;

performing a pre-scan search at successive search steps from a first pre-scan search step to a last pre-scan search step within the plurality of search steps until at least one satellite is acquired;

performing a context awareness decision based, at least in part, on how many satellites were acquired and the configuration of the last pre-scan search step;

setting an initial scan search step from the plurality of search steps based, at least in part, on the context awareness decision, wherein setting the initial scan search step comprises setting the initial scan search step to a search step within the plurality of search steps having a sensitivity greater than the last pre-scan search step; and performing a scan search to identify unacquired satellites using the initial scan search step wherein the initial scan search step has a greater sensitivity than the last pre-scan search step and wherein performing a scan search includes performing the search at successive search steps starting at the initial scan search step.

2. The method of claim 1, further comprising calculating a navigational solution when at least four satellites have been acquired.

3. The method of claim 1, wherein the pre-scan search returns a plurality of satellite acquisitions at a search step corresponding to a relatively stronger signal and wherein setting the initial scan search step comprises setting the initial scan search step to the first search step.

4. The method of claim 1, wherein the pre-scan search returns no satellite acquisitions at a search step corresponding to a relatively stronger signal and wherein setting the initial scan search step comprises setting the initial scan search step to the second search step.

5. The method of claim 1, wherein the pre-scan search returns only one satellite acquisition at a search step corresponding to a relatively stronger signal and wherein setting the initial scan search step comprises setting the initial scan search step to the third search step.

6. The method of claim 5, wherein the third search step is a last search step of the plurality of search steps.

7. The method of claim 5, further comprising performing a supplemental search scan at a fourth search step, wherein the fourth search step has a sensitivity greater than the last pre-scan search step and less than a last search step, acquiring a satellite in the supplemental search scan, decoding bit edge timing information from the satellite acquired in the supplemental search scan, and performing the scan search at the third search step using the bit edge timing information.

8. The method of claim 1, further comprising increasing the sensitivity of a subsequent search step when fewer than four satellites are acquired during the scan search using the initial scan search step.

9. The method of claim 8, further comprising determining bit edge timing information when required for the increased sensitivity subsequent search step.

10. A mobile receiver for acquiring signals based on predicted environmental context, wherein the receiver is configured with a plurality of search steps, wherein each search step comprises a correlation operation having a total integration time and is configured to correspond to a distinct signal level ranging from relatively stronger to relatively weaker such that the total integration time for each search step is greater than the total integration time for a preceding search step, wherein the plurality of search steps includes a first search step having less sensitivity than a second search step having less sensitivity than a third search step and wherein the receiver is configured to:
 perform a pre-scan search at successive search steps from a first pre-scan search step to a last pre-scan search step within the plurality of search steps until at least one satellite is acquired;
 perform a context awareness decision based, at least in part, on how many satellites were acquired and the configuration of the last pre-scan search step;
 set an initial scan search step from the plurality of search steps based, at least in part, on the context awareness decision, wherein the receiver is configured to set the initial scan search step by setting the initial scan search step to a search step within the plurality of search steps having a sensitivity greater than the last pre-scan search step; and
 perform a scan search to identify unacquired satellites using the initial scan search step wherein the initial scan search step has a greater sensitivity than the last pre-scan search step and wherein the receiver is configured to perform the scan search by performing the search at successive search steps starting at the initial scan search step.

11. The mobile receiver of claim 10, wherein the receiver is further configured to calculate a navigational solution when at least four satellites have been acquired.

12. The mobile receiver of claim 10, wherein the receiver is configured to set the initial scan search step to the first search step when the pre-scan search returns a plurality of satellite acquisitions at a search step corresponding to a relatively stronger signal.

13. The mobile receiver of claim 10, wherein the receiver is configured to set the initial scan search step to the second search step when the pre-scan search returns no satellite acquisitions at a search step corresponding to a relatively stronger signal.

14. The mobile receiver of claim 10, wherein the receiver is configured to set the initial scan search step to the third search step when the pre-scan search returns only one satellite acquisition at a search step corresponding to a relatively stronger signal.

15. The mobile receiver of claim 14, wherein the third search step is a last search step of the plurality of search steps.

16. The mobile receiver of claim 14, wherein the receiver is further configured to:
 perform a supplemental search scan at a fourth search step, wherein the fourth search step has a sensitivity greater than the last pre-scan search step and less than a last search step of the plurality of search steps;
 acquire a satellite in the supplemental search scan,
 decode bit edge timing information from the satellite acquired in the supplemental search scan; and
 perform the scan search at the third search step using the bit edge timing information.

17. The mobile receiver of claim 10, wherein the receiver is further configured to increase the sensitivity of a subsequent search step when fewer than four satellites are acquired during the scan search using the initial scan search step.

18. The mobile receiver of claim 17, wherein the receiver is further configured to determine bit edge timing information when required for the increased sensitivity subsequent search step.

* * * * *